United States Patent
Pääkkönen et al.

(10) Patent No.: US 10,767,307 B2
(45) Date of Patent: *Sep. 8, 2020

(54) METHOD FOR CATALYTIC OXIDATION OF CELLULOSE AND METHOD FOR MAKING A CELLULOSE PRODUCT

(71) Applicant: UPM-Kymmene Corporation, Helsinki (FI)

(72) Inventors: Timo Pääkkönen, Helsinki (FI); Tapani Vuorinen, Espoo (FI); Markus Nuopponen, Helsinki (FI)

(73) Assignee: UPM-KYMMENE, CORPORATION, Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/907,905

(22) PCT Filed: Jul. 29, 2014

(86) PCT No.: PCT/FI2014/050600
§ 371 (c)(1),
(2) Date: Jan. 27, 2016

(87) PCT Pub. No.: WO2015/015056
PCT Pub. Date: Feb. 5, 2015

(65) Prior Publication Data
US 2016/0160440 A1  Jun. 9, 2016

(30) Foreign Application Priority Data

Jul. 29, 2013  (FI) ..................... 20135800

(51) Int. Cl.
| C08B 15/02 | (2006.01) |
| D21C 9/00 | (2006.01) |
| D21H 11/18 | (2006.01) |
| C08B 15/04 | (2006.01) |

(52) U.S. Cl.
CPC .............. D21C 9/005 (2013.01); C08B 15/02 (2013.01); C08B 15/04 (2013.01); D21C 9/007 (2013.01); D21H 11/18 (2013.01)

(58) Field of Classification Search
CPC .................................. C08B 15/02; D21C 9/00
USPC .......................................... 536/70, 124, 128
See application file for complete search history.

(56) References Cited

U.S. PATENT DOCUMENTS

| 6,379,494 B1 | 4/2002 | Jewell et al. |
| 6,409,881 B1 | 6/2002 | Jaschinski |
| 6,716,976 B1 | 4/2004 | Jetten et al. |
| 6,770,168 B1 | 8/2004 | Stigsson et al. |
| 6,919,447 B2 | 7/2005 | Komen et al. |
| 7,001,483 B2 | 2/2006 | Severeid et al. |
| 9,410,285 B2 * | 8/2016 | Vuorinen ................ C08B 15/04 |
| 2005/0121159 A1 | 6/2005 | Jetten et al. |
| 2005/0121160 A1 * | 6/2005 | Jetten et al. ............. D21C 3/16 162/81 |
| 2012/0297555 A1 | 11/2012 | Chene et al. |
| 2014/0014283 A1 | 1/2014 | Lindstrom et al. |
| 2014/0249305 A1 | 9/2014 | Tanaka et al. |
| 2015/0322171 A1 | 11/2015 | Tienvieri et al. |
| 2016/0201261 A1 | 7/2016 | Nuopponen et al. |

FOREIGN PATENT DOCUMENTS

| AT | 501929 A1 | 12/2006 |
| CN | 1324784 A | 12/2001 |
| CN | 1341125 A | 3/2002 |
| CN | 101772517 A | 7/2010 |
| CN | 102652154 A | 8/2012 |
| CN | 102675475 A | 9/2012 |
| CN | 102776594 A | 11/2012 |
| CN | 102787444 A | 11/2012 |
| EP | 0226414 A2 | 12/1986 |
| EP | 1149846 A1 | 10/2001 |
| EP | 1245722 A2 | 10/2002 |
| EP | 1264845 A2 | 12/2002 |
| EP | 1505199 A1 | 2/2005 |
| EP | 2216345 A1 | 8/2010 |
| EP | 2574633 A1 | 4/2013 |
| EP | 2784209 A1 | 10/2014 |
| JP | 0463901 A | 11/1971 |
| JP | 46003901 | 11/1971 |
| JP | H10251302 | 9/1998 |

(Continued)

OTHER PUBLICATIONS

Isogai A (2011a) TEMPO—oxidized cellulose nanofibers. Nanoscale 3:71-85. (Year: 2011).*
Isogai T (2011b) Wood cellulose nanofibrils prepared by TEMPO electro-mediated oxidation. Cellulose 18:421-431. (Year: 2011).*
Iwamoto S, Kai W, Isogai T, Saito T, Isogai A, Iwata T (2010) Comparison study of TEMPO—analogous compounds on oxidation efficiency of wood cellulose for preparation of cellulose nanofibrils. Polym Degrad Stab 95:1394-1398. (Year: 2010).*
International Search Report dated Nov. 18, 2014; International Application No. PCT/FI2014/050669; International Filing Date Sep. 2, 2014 (2 pages).
Isogai, A., et al., "Preparation of Polyuronic Acid from Cellulose by TEMPO—mediated Oxidation" Cellulose (1998) vol. 5, 153-164.

(Continued)

*Primary Examiner* — Shaojia A Jiang
*Assistant Examiner* — Everett White
(74) *Attorney, Agent, or Firm* — Cantor Colburn LLP

(57) ABSTRACT

A method for catalytic oxidation of cellulose using a heterocyclic nitroxyl radical as catalyst, main oxidant acting as oxygen source, and an activator of the heterocyclic nitroxyl radical, comprises—a preliminary activation step of the heterocyclic nitroxyl radical with hypochlorite to activated catalyst, and after the preliminary activation step, a cellulose oxidation step using the activated catalyst and hypochlorite as the main oxidant to oxidize cellulose. In the cellulose oxidation step, fibrous starting material is subjected to the oxidation to oxidize the cellulose, whereafter the oxidized fibrous raw material is disintegrated to nanofibrillar cellulose (NFC).

23 Claims, 1 Drawing Sheet

(56) References Cited

FOREIGN PATENT DOCUMENTS

| | | | | | |
|---|---|---|---|---|---|
| JP | 2001329001 | A | 11/2001 | | |
| JP | 2003073402 | A | 3/2003 | | |
| JP | 2003089701 | A | 3/2003 | | |
| JP | 2003512540 | A | 4/2003 | | |
| JP | 2009068014 | A | 4/2009 | | |
| JP | 2009161613 | A | 7/2009 | | |
| JP | 2009209218 | A | 9/2009 | | |
| JP | 2011184475 | A | 9/2011 | | |
| JP | 2011195660 | A | 10/2011 | | |
| JP | 2011219551 | A | 11/2011 | | |
| JP | 2012188472 | A | 10/2012 | | |
| JP | 20122017135 | A | 10/2012 | | |
| JP | WO 2012150701 | A1 * | 11/2012 | ............... | C08B 1/08 |
| JP | 2013096039 | | 5/2013 | | |
| JP | 2014040530 | A | 3/2014 | | |
| WO | 0050462 | A | 8/2000 | | |
| WO | 0050462 | A1 | 8/2000 | | |
| WO | 0123909 | A1 | 4/2001 | | |
| WO | 0129309 | A1 | 4/2001 | | |
| WO | 2005058972 | A1 | 6/2005 | | |
| WO | 2009021688 | A1 | 2/2009 | | |
| WO | 2009069641 | A1 | 6/2009 | | |
| WO | 2009084566 | A1 | 7/2009 | | |
| WO | 2009111915 | A1 | 9/2009 | | |
| WO | 2011024807 | A1 | 3/2011 | | |
| WO | 2012115590 | A1 | 8/2012 | | |
| WO | 2012168562 | A1 | 12/2012 | | |
| WO | 2013047218 | A1 | 4/2013 | | |
| WO | 2013137140 | A1 | 9/2013 | | |

OTHER PUBLICATIONS

Written Opinion dated Nov. 18, 2014; International Application No. PCT/FI2014/050669; International Filing Date Sep. 2, 2014 (8 pages).

Chinese Office Action for Chinese Patent Application No. 201480053544.2; dated Feb. 4, 2017; 8 Pages.

Chinese Office Action for Chinese Patent Application No. 201480053544.2; dated Feb. 4, 2017; English Translation; 10 Pages.

Anelli, et al. "Fast and Selective Oxidation of Primary Alcohols to Aldehydes or to Carboxylic Acids and of Secondary Alcohols to Ketones Mediated by Oxoammonium Salts under Two-Phase Conditions" J. Org. Chem. 1987, vol. 52, pp. 2559-2562.

Hirota et al., "Oxidation of regenerated cellulose with NaClO2 catalyzed by TEMPO and NaClO under acid-neutral conditions" Carbohydrate Polymers 78 (2009) 330-335.

International Search Report dated Oct. 15, 2014; International Application No. PCT/FI2014/050600; International Filing Date Jul. 29, 2014 (3 pages).

Saito, et al. "Cellulose Nanotibers Prepared by TEMPO—Mediated Oxidation of Native Cellulose" Biomacromolecules 2007, vol. 8, 2485-2491.

Written Opinion dated Oct. 15, 2014; International Application No. PCT/FI2014/050600; International Filing Date Jul. 29, 2014; (7 pages).

Zhao et al., "Oxidation of Primary Alcohols to Carboxylic Acids with Sodium Chlorite Catalyzed by Tempo and Bleach: 4-Methoxyphenylacetic Acid (Benzeneacetic acid, 4-methoxy-)" Organic Syntheses, vol. 81, pp. 195-203 (2005).

Jiang, N. et al. "Cu(II) Selective Aerobic Oxidation of Alcohols under Mllg Conditions", J. Org. Chem. 2006, vol. 71, pp. 7087-7090.

Mannam, S. et al. "Aerobic, Chemoselective Oxidation of Alcohols to Carbonyl Compounds Catalysed by a DABCO—Copper Complex Under Mild Conditions", Adv. Synth. Catal. 2007, vol. 349, pp. 2253-2258.

European Search Report for European Application No. 12735922.2, dated Aug. 16, 2017, 5 Pages.

"Biological technology of fibers", the 2nd ed. Chen Hongzhang, Chemical Industry Publisher, Feb. 28, 2011, pp. 19-21.

"Cellulose ether", Shao Zigiang, Chemical Industry Publisher, Sep. 31, 2007, pp. 12-14.

* cited by examiner

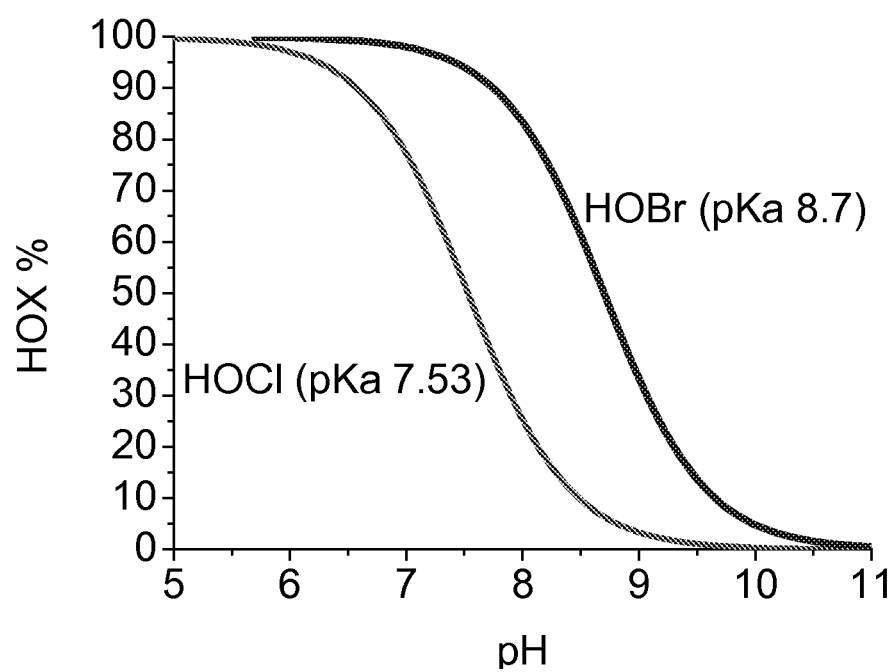

US 10,767,307 B2

METHOD FOR CATALYTIC OXIDATION OF CELLULOSE AND METHOD FOR MAKING A CELLULOSE PRODUCT

CROSS-REFERENCE TO RELATED APPLICATIONS

This application is a National Stage application of PCT/FI2014/050600, filed Jul. 29, 2014, which claims the benefit of Finnish Application No. 20135800, filed Jul. 29, 2013, both of which are incorporated by reference herein in their entirety.

FIELD OF THE INVENTION

The invention relates to a method for catalytic oxidation of cellulose using a heterocyclic nitroxyl radical as catalyst.

BACKGROUND OF THE INVENTION

Cellulose is a renewable natural polymer that can be converted to many chemical derivatives. The derivatization takes place mostly by chemical reactions of the hydroxyl groups in the β-D-glucopyranose units of the polymer. By chemical derivatization the properties of the cellulose can be altered in comparison to the original chemical form while retaining the polymeric structure. Reaction selectivity is important so that a derivative of desired chemical structure could be obtained.

Heterocyclic nitroxyl compounds are known as catalysts that participate in the selective oxidation of C-6 hydroxyl groups of cellulose molecules to aldehydes and carboxylic acids, the corresponding oxoammonium salt being known as the active direct oxidant in the reaction series. One of these chemical oxidation catalysts known for a long time is "TEMPO", i.e. 2,2,6,6-tetramethylpiperidinyl-1-oxy free radical. Thus, the oxidized forms of the nitroxyl radicals, N-oxoammoniumions, act as direct oxidants in the oxidation of the target cellulose molecule, whereas a main oxidant is used to bring oxygen to the reaction series and convert the nitroxyl compound back to the oxidized form.

It is known to oxidize primary alcohols to aldehydes and carboxylic acids through "TEMPO" by using sodium hypochlorite as the main oxidant (for example Anelli, P. L.; Biffi, C.; Montanari, F.; Quici, S.; *J. Org. Chem.* 1987, 52, 2559). To improve the yield in the oxidation of the alcohols to carboxylic acids, a mixture of sodium hypochlorite and sodium chlorate was also used (Zhao, M. M.; Li, J.; Mano, E.; Song, Z. J.; Tschaen, D. M.; *Org. Synth.* 2005, 81, 195).

It is also known procedure to catalytically oxidize cellulose in native cellulose fibers through "TEMPO" by using sodium hypochlorite as main oxidant (oxygen source) and sodium bromide as activator (Saito, T. et al.; Cellulose Nanofibers Prepared by TEMPO-Mediated Oxidation of Native Cellulose, *Biomacromolecules* 2007, 8, 2485-2491). The primary hydroxyl groups (C6-hydroxyl groups) of the cellulosic β-D-glucopyranose units are selectively oxidized to carboxylic groups. Some aldehyde groups are also formed from the primary hydroxyl groups. When the fibers of oxidized cellulose so obtained are disintegrated in water, they give stable transparent dispersion of individualized cellulose fibrils of 3-5 nm in width, that is, so-called nanofibrillar cellulose.

Selectivity of the oxidation is important so that chemicals used are not consumed to unwanted side reactions. Selectivity can be defined as ratio of carboxylic groups formed to the main oxidant consumed.

The use of sodium bromide as activator is preferred because it accelerates the reaction. For example WO01/29309 recommends touse 3 parts by weight NaBr to 4 parts of NaOCl. In the reaction series, the bromide ion acts as oxygen mediator between the main oxidant and the nitroxyl radical by oxidation to hypobromite and reduction back to bromide.

It has been presumed that high level of cellulose oxidation (such as 1.5 mmol COOH/g pulp for example), attainable by the use of sodium bromide at an optimum pH of about 10, is preferable so that the pulp can be easily disintegrated to nanofibrillar cellulose. However, in these oxidation conditions side reactions increase, which results in lowered DP (degree of polymerization) of the cellulose and consequently in lowered strength properties and gel formation ability of the nanofibrillar cellulose. In EP2216345A1, the lowering of the DP is compensated for by performing the oxidation in acidic or neutral conditions.

The use of bromine compounds in the oxidation reaction is problematic because of environmental concerns. Sodium bromide is usually used in the reaction mixture in relatively large amounts (conventionally 100-125 kg/1000 kg pulp) and it is difficult to remove bromide residues from the final cellulose product. Bromine compouds also accumulate in process waters. Further, the use of bromine in industrial scale is undesirable. Use of large amounts of sodium bromide cause corrosion problems in the equipment. Bromine compounds are generally recognized as hazardous to health, for example bromate anion which is formed as a result of side reactions is a suspected carcinogen.

Further, the optimum pH is clearly in the alkaline range when bromide-hypobromite cycle is used in the reaction, which makes the method more susceptible to side reactions.

SUMMARY OF THE INVENTION

It is a purpose of the invention to provide a method for effectively and selectively oxidizing the C-6 hydroxyl groups of cellulose.

It is a further object to provide a method for making nanofibrillar cellulose.

It is also a purpose of the invention to simplify the process of catalytic oxidation.

In the method, the heterocyclic nitroxyl compound is activated first by hypochlorite, whereafter the catalytic oxidation of cellulose is performed.

It has been found that heterocyclic nitroxyl radicals such as 2,2,6,6-tetramethylpiperidinyl-1-oxy radical (TEMPO) can be activated by hypochlorite from the stable radical form to the active oxidized form in a preliminary step, whereafter the catalytic oxidation of cellulose can proceed to the desired degree of oxidation by means of the catalyst and a main oxidant (such as hypochlorite), which is the oxygen source of the oxidation process. In the practice, sodium hypochlorite solution can be used in the activation by adjusting its pH with an acid.

The hypochlorite activation of the catalyst is performed in the absence of cellulose. After the preliminary activation step, the activated catalyst is used in the cellulose oxidation step in a reaction medium containing cellulose and main oxidant, preferably hypochlorite. The pH of the reaction medium is kept in the range favorable to the oxidation process by adding alkaline pH adjusting agent, for example sodium hydroxide.

The activation agent, hypochlorite, can be used in excess amounts in the preliminary step, because it is not necessary to separate it from the reaction mixture after the activation, but the reaction mixture can be used as such in the cellulose oxidation step, where any excess hypochlorite will be consumed in the oxidation of cellulose. During the cellulose oxidation step, hypochlorite is added gradually to achieve the desired oxidation level of cellulose.

The use of separate preliminary activation step, which precedes the cellulose oxidation step, enables sufficient reaction time in optimum conditions, to achieve high efficiency in the oxidation. The hypochlorite concentration can be kept higher than in the cellulose oxidation step. The pH in the activation step is below 9, preferably in the range of 6-8, and most preferably 6.5-7.5. The cellulose oxidation step can be performed in higher pH values, at 7-10, preferably 8-9.5. In the cellulose oxidation step, the pH is lower than is generally recommended for catalytic oxidation of cellulose when bromide is used as activator.

The preliminary activation step with hypochlorite is preferably performed in a closed reaction vessel.

Thus, the heterocyclic nitroxyl radical can be activated by hypochlorite without the use of bromide or iodide. The catalytic oxidation of cellulose by means of the catalyst can be performed in optimum conditions in regard to structural integrity (DP value) of the cellulose.

In the oxidation process during the cellulose oxidation step, the cellulose is oxidized at C-6 carbons to carboxyl groups through the catalytic activity using a main oxidant, which provides the oxygen for the reaction and whose amount in relation to the amount of cellulose can be used to adjust the degree of conversion of the cellulose. Hypochlorite, such as sodium hypochlorite, can be used as the main oxidant. Residual aldehyde groups can be oxidized to carboxyl groups in a second step to complete the oxidation process and to attain a desired oxidation degree, expressed as carboxylate content (mmol COOH/g pulp). The second cellulose oxidation step is performed in acidic conditions using chlorite, such as sodium chlorite ($NaClO_2$) as oxidant.

The consistency of the pulp in the reaction medium where the oxidation is performed is preferably above 3%.

In fact, according to an advantageous embodiment, the reaction is performed at medium consistency of the pulp to increase selectivity. When medium consistency of the pulp is used, the selectivity of the cellulose oxidation can be improved, because the desired reactions take place in the fiber, whereas the unwanted side reactions take place in the solution phase.

The medium consistency is initial consistency of the cellulosic raw material that is higher than normally used. The consistency of the pulp is above 6%, especially above 6% and at the most 12%, more preferably equal to or higher than 8%, and most preferably in the range of 8-12% by weight. Within the last-mentioned range, the optimum consistency is supposed to be in the range of 9-11%. The consistency values are the initial consistency at the beginning of the oxidation.

However, the cellulose oxidation step can be performed even at pulp initial consistencies equal to or lower than 3%, for example in consistencies in the range of 2-4%.

After the cellulose oxidation step, the cellulose can be processed to a final cellulose product. When the starting material is pulp derived from plants, especially wood, the cellulose exists in fiber form. The fibers that contain the cellulose in oxidized form as a result of the oxidation process are easy to disintegrate by mechanical methods to small-scaled fragments, nanofibrillar cellulose (NFC). Thus, the method for forming the cellulose product comprises the preliminary activation step, the cellulose oxidation step using pulp as raw material for the oxidation, and a disintegration step where the pulp is disintegrated to nanofibrillar cellulose.

BRIEF DESCRIPTION OF THE DRAWINGS

In the following, the invention will be described with reference to the appended drawings, where FIG. 1 shows the pKa values of hypochlorite and hypobromite.

DETAILED DESCRIPTION OF THE PREFERRED EMBODIMENTS

In the following disclosure, all percent values are by weight, if not indicated otherwise. Further, all numerical ranges given include the upper and lower values of the ranges, if not indicated otherwise.

In the present application all results shown and calculations made, whenever they are related to the amount of pulp, are made on the basis of dry pulp.

In the method, the primary hydroxyl groups of cellulose are oxidized catalytically by a heterocyclic nitroxyl compound, for example 2,2,6,6-tetramethylpiperidinyl-1-oxy free radical, "TEMPO". Other heterocyclic nitroxyl compounds known to have selectivity in the oxidation of the hydroxyl groups of C-6 carbon of the glucose units of the cellulose can also be used, and these compounds are widely cited in the literature. Hereinafter, the oxidation of cellulose refers to the oxidation of these hydroxyl groups to aldehydes and carboxyl groups. Part of the hydroxyl groups that are subjected to oxidation can exist as aldehyde groups in the oxidized cellulose, or the oxidation to carboxyl groups can be complete. The oxidation level is in turn determined by the ratio of main oxidant to the cellulose.

Whenever the catalyst "TEMPO" is mentioned in this disclosure, it is evident that all measures and operations where "TEMPO" is involved apply equally and analogously to any derivative of TEMPO or any heterocyclic nitroxyl radical capable of catalyzing selectively the oxidation of the hydroxyl groups of C-6 carbon in cellulose.

In the following description, catalytic oxidation refers to nitroxyl-mediated (such as "TEMPO"-mediated) oxidation of hydroxyl groups. The catalytic oxidation of fibers or fibrous material in turn refers to material which contains cellulose that is oxidized by nitroxyl-mediated (such as "TEMPO"-mediated) oxidation of hydroxyl groups of the cellulose.

Preliminary Activation Step

The heterocyclic nitroxyl compound used as catalyst in the oxidation process (such as "TEMPO") is stable in its neutral, radical form, and it can be stored in that form. The catalyst is activated to oxidized form, which can participate at once in the reaction as catalyst, and the oxidation process of the cellulose starts quickly.

The structural formula of "TEMPO" in its radical form is given below

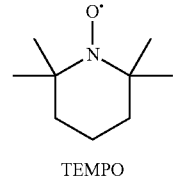

TEMPO

The heterocyclic nitroxyl radical is activated in the preliminary activation step with hypochlorite so that it will be effective as catalyst in the oxidation of cellulose. The activation step is performed preferably in an aqueous medium using excess amount of hypochlorite with regard to the catalyst. The activation is performed at pH below 9, preferably 6-8. If sodium hypochlorite is used, the pH of the reaction medium is adjusted to suitable range with an acid, such as sulphuric acid. Organic acids or hydrochloric acid can also be used for the pH adjustment. The radical can be added to the medium after the pH adjustment, preferably in the molten state. Alternatively, the radical, preferably in molten state, can be dissolved first in the water or in the hypochlorite solution, and the pH can be adjusted thereafter. FIG. 1 shows a comparison between the titration curves of HOCl and HOBr. Because of lower pKa value of hypochlorite/hypochlorous acid combared to the corresponding bromine species (7.53 vs. 8.7), both the activation and the oxidation can be performed at a lower pH than with hypobromite. The optimum pH range is in the range where the proportion of the dissociated (anionic form) is high. Even though the hypochlorite has a lower activation efficiency compared with hypobromite, the preliminary activation step separately from the oxidation step of the cellulose enables a higher concentration of the active heterocyclic nitroxyl compound for the subsequent cellulose oxidation step. The presumed mechanism of hypochlorite activation and oxidation is shown in the scheme below, using TEMPO as an example of the heterocyclic nitroxyl radical.

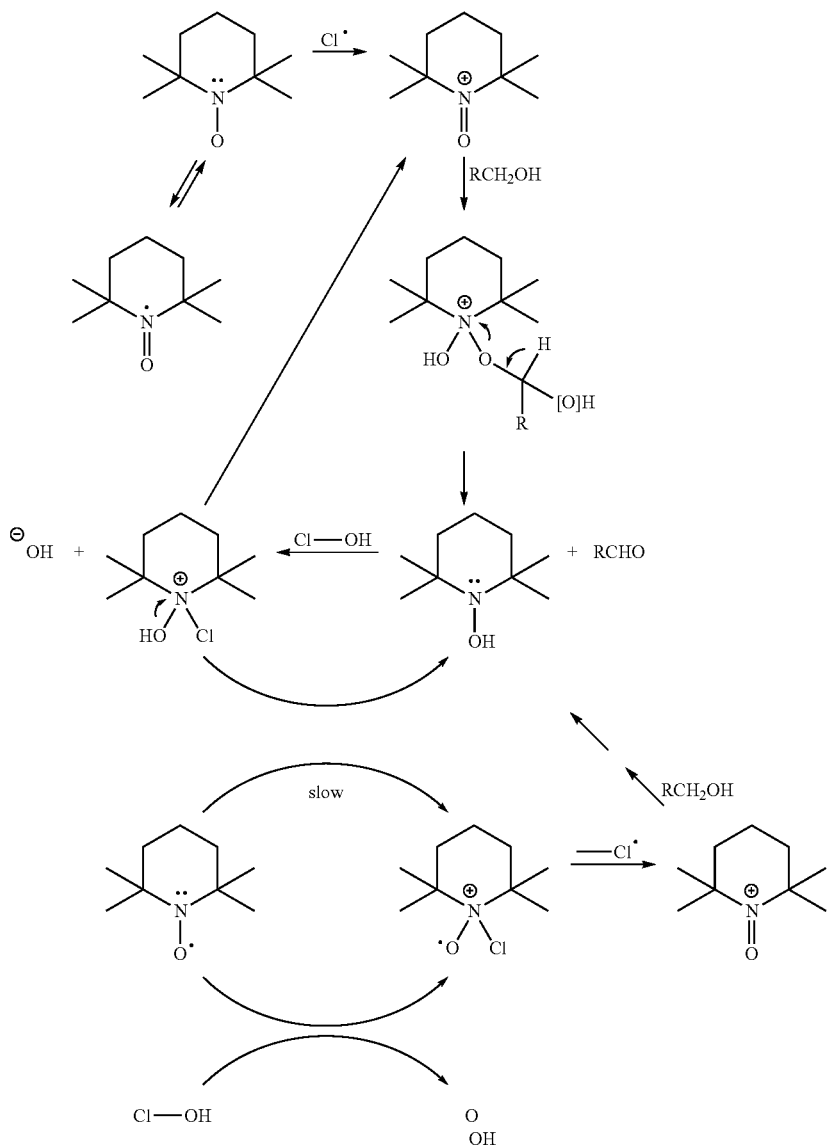

The TEMPO radical is converted by the hypochlorite to the active, oxidized nitrosonium form, as is shown in the top part of the scheme. The scheme also illustrates the cycle of the TEMPO catalyst between the oxidized and reduced (hydroxylamine) forms during the cellulose oxidation step. The activation step is performed preferably in a closed reaction vessel.

The duration of the preliminary activation step is typically under half an hour, about 10-20 min, and in any case it is clearly shorter than the duration of the subsequent cellulose oxidation step (reaction time of oxidation). In a preferred embodiment, the heterocyclic nitroxyl radical is added to the medium in molten state, either before or after the pH adjustment, to facilitate its dosing and mixing. For example the melting point of TEMPO radical is about 37° C.

The hypochlorite is used in the activation step preferably in the stoichiometric ratio of 1:1-3:1 to the heterocyclic nitroxyl radical. The hypochlorite is used preferably in excess, that is, the ratio is more than 1:1.

Cellulose Oxidation Step Using the Activated Catalyst

The reaction medium for oxidation of the cellulose comprises activated heterocyclic nitroxyl catalyst, cellulose, and main oxidant, which is preferably sodium hypochlorite. The oxidation process is performed in a reactor which is equipped with mixing of the reaction medium and control of reaction conditions. The catalyst and the main oxidant are added preferably to a fibrous suspension of cellulose fibres to achieve a desired starting consistency of the reaction medium. The consistency can be in the medium consistency range as described above, but lower consistencies can be used as well. The activated catalyst can be added by adding the whole volume of the reaction medium used in the preliminary activation step, without the need to separate the catalyst. Any excess hypochlorite left in the reaction medium in the activation step can be used as the main oxidant in the oxidation step. The presence of hypochlorite in the reaction medium of the activation step will also trigger the oxidation reaction at once when the activated catalyst is added to the cellulose. The main oxidant can be added portion wise during the reaction. It is advantageous to add the main oxidant, such as hypochlorite, continuously as the oxidation of cellulose proceeds to avoid excess concentrations which may cause unwanted side reactions.

The fibrous starting material which is suspended in the reaction medium can be any of the above mentioned materials, especially fibres of plant origin which form, when suspended in aqueous reaction medium, a pulp of given consistency. The fibers can be especially from wood. Chemical pulp, such as softwood or hardwood pulp, for example bleached birch pulp, can be used.

The oxidation reaction is allowed to proceed till a required conversion degree (oxidation level) has been achieved. As expressed in carboxylate groups generated as the result of oxidation, this is normally 0.5-1.4 mmol COOH/g pulp, calculated as dried pulp.

The oxidation reaction is allowed to proceed till a required conversion degree (oxidation level has been achieved. As expressed in carboxylate groups generated as the result of oxidation, this is normally 0.5-1.4 mmol COOH/g pulp.

For the purpose of making NFC, it has been found that the oxidation level (conversion degree) of 0.5-1.1 mmol COOH/g pulp, preferably 0.6-0.95 and most preferably 0.7-0.9 is already sufficient that the cellulose fibers can be easily disintegrated to fibrils by mechanical energy.

The dosage of hypochlorite to cellulose, to reach the above-mentioned conversions, can be 1.7 to 5 mmol/g pulp, preferably 2.2-2.7 mmol/g pulp.

The consistency of the pulp in the reaction medium where the oxidation is performed is preferably above 3%.

In fact, according to an advantageous embodiment, the reaction is performed at medium consistency of the pulp to increase selectivity. When medium consistency of the pulp is used, the selectivity of the cellulose oxidation can be improved, because the desired reactions take place in the fiber, whereas the unwanted side reactions take place in the solution phase.

The medium consistency is initial consistency of the cellulosic raw material that is higher than normally used. The consistency of the pulp is above 6%, especially above 6% and at the most 12%, more preferably equal to or higher than 8%, and most preferably in the range of 8-12% by weight. Within the last-mentioned range, the optimum consistency is supposed to be in the range of 9-11% A. The consistency values are the initial consistency at the beginning of the oxidation.

In all above-described embodiments the catalytic oxidation can be performed without the use of bromide. Sodium bromide, which is conventionally used as activator and cocatalyst because of the faster reaction rate and high degree of oxidation, can be avoided in the catalytic oxidation process according to still one embodiment. Conventionally, the optimum pH when sodium bromide is used is 10. However, side reactions occur at this pH which cannot be avoided even at the relatively fast reaction rate. The DP value (degree of polymerization) will decrease considerably, which decreases the strength characteristics and gel forming ability of the NFC.

Thus, according to still one embodiment, the catalytic non-bromine oxidation with the heterocyclic nitroxyl catalyst, which has been initially activated by hypochlorite in the preliminary activation step, preferably performed at the above mentioned medium consistency of the pulp, can be performed by using carefully defined conditions with regard to pH and temperature. The reaction is performed in neutral or slightly alkaline pH, at 7-10, more preferably in the range of 8-9.5, and at room temperature or slightly elevated temperature, in the range of 15-50° C., preferably 20-40° C., most preferably 26-35° C., in the absence of added alkali metal halide (bromide or iodide). The selectivity (less C2 ja C3 reactions) is improved, and bromine compounds are avoided. The slower oxidation reaction rate due to the lower pH is compensated by the temperature, which does not increase the side reactions as much as the higher pH.

Temperature control can be used to keep the temperature within the above ranges during the reaction. Because the oxidation is exothermic, the temperature of the reaction medium will rise if cooling is not provided. The rise is about 10° C. between the start and the end point. Thus, in the range of 15-50° C. the reaction can start below at 30° C. and end below 40° C., for example start at 24-26° C. and end at 34-36° C.

When the cellulose oxidation step using the hypochlorite-activated catalyst has proceeded so that a desired conversion degree is reached, the oxidation step is stopped. The oxidized cellulose is separated from the reaction medium and washed. The catalyst left in the reaction medium can be reused, for example it can reactivated with hypochlorite for a new cellulose oxidation step.

During the catalytic oxidation, part of the hydroxyl groups of the cellulose in C-6 carbon are oxidized incompletely to aldehydes. If aldehydes are not wanted in the oxidation product, the oxidation can be completed by oxidizing the aldehyde groups to carboxylate groups in a second, complementary cellulose oxidation step, using different reaction conditions.

The second, complementary oxidation step for converting the residual aldehydes to carboxylates to reach the final carboxylate content is performed in a reaction medium where the pH is clearly on acidic side, about 1.5-4, preferably 2-3. Preferably the second step is performed at a pH below 3. The oxidized cellulose separated from the reaction medium of the cellulose oxidation step is mixed with the new reaction medium. Alternatively, the pH of the reaction medium of the cellulose oxidation step can be lowered directly to the pH range of the second, complementary oxidation step at the stop point of the preceding cellulose oxidation step.

In the second, complementary oxidation chlorite, for example sodium chorite, is used as oxidant, according to the scheme shown below. The chlorite is in the form of chlorous acid ($HClO_2$, pKa 1.96) in the acidic conditions. The chlorous acid oxidizes the aldehyde groups of the cellulose to carboxylic acid groups.

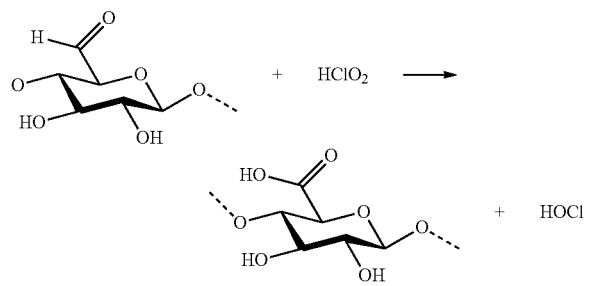

Dimethyl sulfoxide (DMSO) can be used in the reaction medium in the second complementary oxidation step to eliminate the formation of hypochlorite from chlorite.

Thus, it is possible to complete the oxidation in the second step to obtain cellulose with the target oxidation levels (COOH/g pulp).

Instead of a second oxidation step, it is also possible to perform a reduction step where the aldehyde groups are reduced back to hydroxyl groups by using a suitable reducing agent, such $NaBH_4$.

The oxidized cellulose obtained form the cellulose oxidation step can be processed further. According to an advantageous embodiment the oxidized cellulose is made to nanofibrillar cellulose (NFC) by known methods, which involve disintegrating the fibres of oxidized cellulose to fibrils.

The term "nanofibrillar cellulose" refers to a collection of isolated cellulose microfibrils or microfibril bundles derived from cellulose raw material. Micro-fibrils have typically high aspect ratio: the length might exceed one micro-meter while the number-average diameter is typically below 200 nm. The diameter of microfibril bundles can also be larger but generally less than 1 μm. The smallest microfibrils are similar to so called elementary fibrils, which are typically 2-12 nm in diameter. The dimensions of the fibrils or fibril bundles are dependent on raw material and disintegration method. The nanofibrillar cellulose may also contain some hemicelluloses; the amount is dependent on the plant source. Mechanical disintegration of the oxidized cellulose raw material is carried out with suitable equipment such as a refiner, grinder, homogenizer, colloider, friction grinder, ultrasound sonicator, fluidizer such as microfluidizer, macrofluidizer or fluidizer-type homogenizer.

The NFC prepared from cellulose raw material oxidized catalytically in the cellulose oxidation step, as described in the present disclosure, has excellent gelling ability, which means that it forms a gel at a low consistency in aqueous medium. For example when the oxidized pulp is ground at a consistency of about 1 to 4% in aqueous medium, a clear gel consisting of microfibrils in water (NFC gel) is obtained.

The fibril cellulose is preferably made of plant material that has been subjected to the oxidation to convert the hydroxyl groups of the cellulose to carboxyl groups with a conversion degree that enhances the disintegration of the material to nanofibrillar cellulose, as dicussed above One preferred alternative is to obtain the microfibrils form non-parenchymal plant material where the fibrils are obtained from secondary cell walls. One abundant source of cellulose fibrils is wood fibres. The nanofibrillar cellulose can thus be manufactured by homogenizing oxidized wood-derived fibrous raw material, which may be chemical pulp. The pulp can be for example softwood pulp or hardwood pulp or a mixture of these. The fibrils originating in secondary cell walls are essentially crystalline with degree of crystallinity of at least 55%.

EXAMPLES

The following examples, which shall not be regarded as restrictive, illustrate the method further.

The reaction time is expressed as period of consumption of hypochlorite (that is, the oxidation time of cellulose) in the cellulose oxidation step.

Example 1

Activation of Radical TEMPO By HOCl 0.375 g radical TEMPO was weighted and transferred to closed glass bottle. 50 ml of water was added to bottle. 4 ml of NaClO (12.9%) solution was added to TEMPO solution. pH of TEMPO solution was adjusted to 7.5 by 1 M $H_2SO_4$ using pH meter. Solution was mixed strongly until all radical TEMPO was dissolved.

HOCl Activated TEMPO Oxidation 243 g (48 g as dry) never-dried birch pulp was weighted in closed vessel. Activated TEMPO solution was mixed with pulp. Pulp was shifted to Buchi reactor and 819 ml water was mixed with pulp. Temperature of pulp was set to 18° C. 63 ml (12.9%) NaClO was added to reactor by pump while pulp was mixed strongly. NaClO addition was over after 13 min. pH was kept under 9 during NaClO addition by controlling pumping speed. Temperature of pulp was lifted to 25° C. after NaClO addition and pH was controlled by titrator (pH 9, 1 M NaOH) until all NaClO was consumed (after 152 min). Active chlorine titration was used to monitor NaClO consumption during oxidation process. Strong mixing was continued until all NaClO was consumed. The pulp was washed with ion-changed water after the oxidation. CED-viscosity and carboxylate content of pulp (conductometric titration) was determined after pulp consistency determination.

Conversion of Residual Aldehydes to Carboxylates By Acidic Phase Oxidation:

10 g (calculated as dry) of TEMPO oxidized pulp was weighted and shifted to Buchi reactor. Pulp was diluted by 1000 ml of water. 0.6 g $NaClO_2$ and 2 ml DMSO was mixed with pulp solution. pH of solution was adjusted to 3 by 1 M $H_2SO_4$ using pH meter. Temperature of pulp solution was adjusted to 50° C. and solution was mixed 2 hours until oxidation was ready. Pulp was washed with ion-changed water after oxidation. CED-viscosity and carboxylate content of pulp (conductometric titration) was determined after pulp consistency determination. The results are shown in Table 1 below.

Examples 2 and 3

The Examples 2 and 3 were performed according to Example 1 using the same activation and oxidation procedures. In Example 2, never dried pulp was used and the pH was kept in 9 during the oxidation step, as in Example 1, whereas in the Example, 3 dried pulp was used and the pH was kept in 8. The results are shown in Table 1 below. Never dried pulp and pH 9 (Examples 1 and 2) yield better results in terms of conversion degree, selectivity and reaction time as dried pulp and pH 8 (Example 3).

Example 4 (TEMPO Oxidation By $ClO_2$ Activation, Ccomparative Example)

Activation of Radical TEMPO By $ClO_2$ 0.375 g radical TEMPO was weighted and transferred to closed glass bottle. 40 ml of $ClO_2$ water (5.9 g $ClO_2$/l) was added to bottle. Solution was mixed strongly until all radical TEMPO was dissolved.

$ClO_2$ Activated TEMPO Oxidation 133 g rewetted dried birch pulp (48 g as dry) was weighted in closed vessel. Activated TEMPO solution was mixed with pulp. Pulp was shifted to Buchi reactor and 839 ml water was mixed with pulp. Temperature of pulp was set to 18° C. 63 ml (13.0%) NaClO was added to reactor by pump while pulp was mixed strongly. NaClO addition was over after 22 min. pH was kept under 8 during NaClO addition by controlling pumping speed. Temperature of pulp was lifted to 25° C. after NaClO addition and pH was controlled by titrator (pH 8, 1 M NaOH) until all NaClO was consumed (after 150 min). Active chlorine titration was used to monitor NaClO consumption during oxidation process. Strong mixing was continued until all NaClO was consumed. Pulp was washed with ion-changed water after oxidation. CED-viscosity and carboxylate content of pulp (conductometric titration) was determined after pulp consistency determination. The results are shown in Table 1 below.

Conversion of residual aldehydes to carboxylates by acidic phase oxidation was conducted as described in Example 1

Example 5 (Fibrillation of Pulp By Fluidizator to NFC)

Pulp consistency of the oxidized pulp sample of Example 1 was adjusted to approximately 2.0% by water. Sample was mixed by Turrax 10 min. pH was adjusted to 9 by NaOH and pH meter. Pulp solution was forced by 2000 bar pressure through 200 μm chamber and 100 μm chamber (=1 pass) of fluidizator (Microfluidics M110P). Pulp dispersion formed a gel in fluidization.

In order to characterize NFC gel, turbidity and Brookfield viscosity were measured.

Turbidity may be measured quantitatively using optical turbidity measuring instruments. There are several commercial turbidometers available for measuring quantitatively turbidity. In the present case the method based on nephelometry is used. The units of turbidity from a calibrated nephelometer are called Nephelometric Turbidity Units (NTU). The measuring apparatus (turbidometer) is calibrated and controlled with standard calibration samples, followed by measuring of the turbidity of the diluted NFC sample.

In the method, a nanofibrillar cellulose sample is diluted in water, to a concentration below the gel point of said nanofibrillar cellulose, and turbidity of the diluted sample is measured. Said concentration where the turbidity of the nanofibrillar cellulose samples is measured is 0.1%. HACH P2100 Turbidometer with a 50 ml measuring vessel is used for turbidity measurements. The dry matter of the nanofibrillar cellulose sample is determined and 0.5 g of the sample, calculated as dry matter, is loaded in the measuring vessel, which is filled with tap water to 500 g and vigorously mixed by shaking for about 30 s. Without delay the aqueous mixture is divided into 5 measuring vessels, which are inserted in the turbidometer. Three measurements on each vessel are carried out The mean value and standard deviation are calculated from the obtained results, and the final result is given as NTU units.

Turbidity of the sample was 17 NTU

Brookfield Viscosity

The apparent viscosity of NFC is measured with a Brookfield viscometer (Brookfield viscosity) or another corresponding apparatus. Suitably a vane spindle (number 73) is used. There are several commercial Brookfield viscometers available for measuring apparent viscosity, which all are based on the same principle. Suitably RVDV spring (Brookfield RVDV-III) is used in the apparatus. A sample of the nanofibrillar cellulose is diluted to a concentration of 0.8% by weight in water and mixed for 10 min. The diluted sample mass is added to a 250 ml beaker and the temperature is adjusted to 20° C.±1° C., heated if necessary and mixed. A low rotational speed 10 rpm is used.

Brookfield viscosity of the sample was 11,220 mPas

Example 6

Activation of Radical TEMPO by HOCl 56 g radical TEMPO was weighted and transferred to closed vessel. 3 L of water was added to bottle. 0.42 L of NaClO (18%) solution was added to TEMPO solution. pH of TEMPO solution was adjusted to 7.5 by 1 M $H_2SO_4$ using pH meter. Solution was mixed strongly until all radical TEMPO was dissolved.

HOCl Activated TEMPO Oxidation 5.8 kg never-dried birch pulp was pulpered and weighted in closed vessel. Consistency was 6.2%. Activated TEMPO solution was mixed with pulp. Pulp was shifted to mixing reactor. Temperature of pulp was set to 25° C. 6.5 L (18%) NaClO was added to reactor by pump while pulp was mixed strongly. NaClO addition was over after 110 min. pH was kept around pH 8 during NaClO addition by controlling pumping speed. Temperature of pulp was lifted to 31° C. after NaClO addition and pH was controlled by 1.5 M NaOH until all NaClO was consumed (after 145 min). Strong mixing was continued until all NaClO was consumed. Pulp was washed after oxidation. Carboxylate content of pulp (conductometric titration) was determined, 0.80 mmol COOH/g pulp.

This experiment shows that the method is operative in larger scale as well, and it works well at pulp initial consistencies of above 6%, although the reactor used was an ordinary mixer not specifivcaly designed for handling MC pulp.

TABLE 1

Comparison between ClO2 activated TEMPO oxidations (Ex. 4) and HOCl activated TEMPO oxidations (Ex. 1-3).

| Experiment | Ex. 4 (comp.) (1.) ClO2 activated | Ex. 3 (2.) HOCl activated | Ex. 1 (2.) HOCl activated | Ex. 2 (2.) HOCl activated |
|---|---|---|---|---|
| Reaction time (min) | 150 | 170 | 152 | 154 |
| HOCl addition (mmol NaClO/g pulp) | 2.3 | 2.3 | 2.4 | 2.4 |
| TEMPO addition (mmol/g pulp) | 0.05 | 0.05 | 0.05 | 0.05 |
| mmol COOH/g pulp (1 stage oxidation) | 0.76 | 0.70 | 0.90 | 0.87 |
| mmol COOH/g pulp (2 stage oxidation) | 0.91 | 0.92 | 1.02 | 0.98 |
| CED-viscosity (ml/g) (1 stage oxidation) | 197 | 161 | 188 | 154 |
| CED-viscosity (ml/g) (2 stage oxidation) | 465 | 447 | 417 | 359 |
| Selectivity after 2 phase (mmol COOH/mmol NaClO) | 0.72 | 0.70 | 0.80 | 0.78 |
| Temperature (° C.) | 25 | 25 | 25 | 25 |
| pH | 8 | 8 | 9 | 9 |
| Dried (D) or never dried (ND) birch pulp | D | D | ND | ND |

(1.) ClO2 activated TEMPO oxidation
(2.) HOCl activated TEMPO oxidation-

Example 7 ("Atrex" Fibrillation of Oxidized Pulp)

Oxidized cellulose pulp from example 6 was dispersed to water to consistency of 2.0% (w/w) and run 4 times through a disperser (Atrex), through its series of counter rotating rotors. The disperser used had a diameter of 850 mm and rotation speed used was 1800 rpm.

Viscosity of the final product was 19 160 mPas (Brookfield 10 rpm, measured at 0.8%) and turbidity 36 NTU (measured at 0.1%).

Example 8 (Rheometer Viscosity)

The NFC of Example 7 is diluted with deionised water to a concentration of 0.5 w % and 200 g of the mixture is homogenised with a Büchi-mixer (B-400, max 2100 W, Büchi Labortechnik AG, Switzerland) for 3 33 10 s.

The viscosity of the NFC dispersions is measured at 22° C. with a stress controlled rotational rheometer (AR-G2, TA Instruments, UK) equipped with a narrow gap vane geometry (diameter 28 mm, length 42 mm) in a cylindrical sample cup having a diameter of 30 mm. After loading the samples to the rheometer they are allowed to rest for 5 min before the measurement is started. The steady state viscosity is measured with a gradually increasing shear stress (proportional to applied torque) and the shear rate (proportional to angular velocity) is measured. The reported viscosity (=shear stress/shear rate) at a certain shear stress is recorded after reaching a constant shear rate or after a maximum time of 2 min. The measurement is stopped when a shear rate of 1000 s-1 is exceeded. The method is used for determining zero-shear viscosity.

The zero-shear viscosity of the sample was 21,000 Pa s and yield stress was 15 Pa Target Properties of the NFC Prepared from the Oxidized Pulp Typically in the method, the aim is to obtain, as the final product, nanofibrillar cellulose whose Brookfield viscosity, measured at a consistency of 0.8% and at a rotation speed of 10 rpm, is at least 5,000 mPa·s, advantageously at least 15,000. The viscosity is advantageously in the range of 5,000 to 40,000 mPa·s. The aqueous nanofibrillar cellulose dispersions obtained are also characterized by so-called shear thinning behavior; that is, the viscosity decreases as the shear rate increases.

Furthermore, the aim is to obtain nanofibrillar cellulose whose turbidity is typically lower than 90 NTU, for example from 3 to 90 NTU, preferably from 5 to 60, more preferably 8-40 measured at a consistency of 0.1 wt % (aqueous medium), and measured by nephelometry.

Furthermore, the aim is obtain shear thinning nanofibrillar cellulose having a zero shear viscosity ("plateau" of constant viscosity at small shearing stresses) in the range of 1,000 to 100,000 Pa·s, preferably 5,000 to 50,000 and a yield stress (shear stress where shear thinning begins) in the range of 1 to 50 Pa, advantageously in the range of 3 to 15 Pa, determined by rotational reometer at a consistency of 0.5 wt % (aqueous medium).

The invention claimed is:

1. A method for catalytic oxidation of cellulose using a heterocyclic nitroxyl radical as catalyst, main oxidant acting as oxygen source, and an activator of the heterocyclic nitroxyl radical, characterized in that the method comprises
    (a) a separate preliminary activation step of the heterocyclic nitroxyl radical consisting of activating the heterocyclic nitroxyl radical catalyst with hypochlorite in a reaction medium in the absence of cellulose and adjusting the pH with an acid to a pH of 6 to 8; and
    (b) a cellulose oxidation step using the activated catalyst and main oxidant to oxidize primary hydroxyl groups of cellulose in a reaction medium comprising the activated heterocyclic nitroxyl catalyst, cellulose, and main oxidant at a pH higher than the pH of the preliminary activation step; and
    wherein hypochlorite is used as the main oxidant in the cellulose oxidation step.

2. The method according to claim 1, wherein in the cellulose oxidation step, the cellulose is oxidized catalytically using the main oxidant and the activated catalyst at a pH of 7-10.

3. The method according to claim 1, wherein the pulp initial consistency in the cellulose oxidation step is above 6%.

4. The method according to claim 1, wherein in the cellulose oxidation step, the cellulose is oxidized in the absence of bromide or iodide.

5. The method according to claim 1, wherein after the cellulose oxidation step, aldehyde groups in the cellulose are oxidized to carboxylic groups in a second, complementary oxidation step.

6. The method according to claim 1, wherein the cellulose is oxidized to the level of 0.5-1.4 mmol COOH/g pulp.

7. The method according to claim 1, wherein the cellulose subjected to catalytic oxidation in the cellulose oxidation step is the cellulose in fibrous raw material.

8. The method according to claim 1, wherein the pulp initial consistency in the cellulose oxidation step is above 6% and at the most 12%.

9. The method according to claim 1, wherein the pulp initial consistency in the cellulose oxidation step is 8-12%.

10. The method according to claim 1, wherein the cellulose is oxidized to the level of 0.5-1.1 mmol COOH/g pulp.

11. The method according to claim 1, wherein the cellulose is oxidized to the level of 0.6-0.95 mmol COOH/g pulp.

12. The method according to claim 1, wherein the cellulose subjected to catalytic oxidation in the cellulose oxidation step is the cellulose in fibers obtained from plant material.

13. The method of claim 1, wherein the primary hydroxyl groups of the cellulose are oxidized to aldehydes in the cellulose oxidation step.

14. The method of claim 1, wherein the primary hydroxyl groups of the cellulose are oxidized to aldehydes and carboxylic acids in the cellulose oxidation step.

15. The method of claim 1, wherein the temperature of the oxidation step is controlled to be in a range of 26° C. to 35° C.

16. The method according to claim 1, wherein the pH of the preliminary activation step is adjusted to a pH of 6.5-7.5 with an acid, and the pH of the cellulose oxidation step is 8-9.5.

17. The method according to claim 1, comprising adjusting the pH of the cellulose oxidation step to a pH higher than the pH of the preliminary activation step by adding an alkaline pH adjusting agent.

18. The method according to claim 1, wherein the hypochlorite is used in the preliminary activation step in a stoichiometric ratio of hypochlorite:heterocyclic nitroxyl radical catalyst of greater than 1:1 to 3:1.

19. A method for making a cellulose product, comprising
  (a) subjecting fibrous starting material to catalytic oxidation in a cellulose oxidation step according to the method according to claim 1 to obtain oxidized fibrous material, and
  (b) disintegrating the oxidized fibrous raw material.

20. The method according to claim 19, wherein the oxidized fibrous raw material is disintegrated to nanofibrillar cellulose (NFC) having shear-thinning behavior, with zero shear viscosity in the range of 1,000 to 100,000 Pa·s, and with a yield stress in the range of 1 to 50 Pa, determined by rotational rheometer at a consistency of 0.5 wt % in aqueous medium.

21. The method according to claim 20, wherein the nanofibrillar cellulose is essentially crystalline with degree of crystallinity of at least 55%, being made of plant material.

22. The method according to claim 19, wherein the oxidized fibrous raw material is disintegrated to nanofibrillar cellulose (NFC) having shear-thinning behavior, with zero shear viscosity in the range of 5,000 to 50,000 Pa·s, and with a yield stress in the range of 3 to 15 Pa, determined by rotational rheometer at a consistency of 0.5 wt % in aqueous medium.

23. The method of claim 19, wherein the fibrous starting material is fibers obtained from plant material.

* * * * *